United States Patent [19]

Liu

[11] Patent Number: 4,545,195
[45] Date of Patent: Oct. 8, 1985

[54] APPARATUS FOR PEELING AND TWISTING AN ELECTRIC WIRE HAVING AN INSULATING COATING

[76] Inventor: Yung H. Liu, No. 12, Alley 76, La. 255, Sec. 1, Kang Ning Rd., Taipei, Taiwan

[21] Appl. No.: 512,676

[22] Filed: Jul. 11, 1983

[51] Int. Cl.[4] .................. B21F 15/04; B65H 69/06
[52] U.S. Cl. .......................... 57/22; 29/868; 29/872; 140/111; 140/113
[58] Field of Search .............. 57/22, 23, 200, 202; 140/111, 113, 117, 118, 149; 29/868–873, 745–748, 755

[56] References Cited

U.S. PATENT DOCUMENTS

| | | | |
|---|---|---|---|
| 1,895,828 | 1/1933 | Van Inwagen, Jr. | 57/22 X |
| 1,978,164 | 10/1934 | Van Inwagen, Jr. et al. | 140/113 |
| 2,971,319 | 2/1961 | Spencer | 57/22 |
| 3,552,449 | 1/1971 | Woodward et al. | 140/113 X |
| 3,559,698 | 2/1971 | Smith | 140/113 X |
| 3,721,277 | 3/1973 | Rauscher et al. | 140/111 |
| 3,918,330 | 11/1975 | Blaha | 29/868 X |
| 3,959,960 | 6/1976 | Santos | 57/22 |

*Primary Examiner*—John Petrakes
*Attorney, Agent, or Firm*—Cushman, Darby and Cushman

[57] ABSTRACT

An apparatus for peeling and twisting an electric wire having an insulating coating comprises a machine frame, a shaft rotatably mounted on said frame and being adapted to be driven by a motor, a machine body movably mounted on the shaft and an elastic member for urging the machine body to an end position on the shaft. The shaft includes wire clamping cam, insulating coating cutting cam, twisting cam and cut insulating coating disengaging cam. A wire clamping means is mounted on the frame and is following the clamping cam. The machine body includes an insulating coating cutting means which follows the insulating coating cutting cam for cutting the insulating coating of the wire, a conductor twisting means which follows the twisting cam for twisting the conductors of the wire and a cut insulating coating disengaging means which follows the disengaging cam for disengaging the insulating coating which has been cut. The cams of the shaft and their following means are so arranged that they will perform the actions of clamping the wire, cutting the insulating coating, twisting the conductors and disengaging the cut insulating coating when the shaft has revolved a cycle.

16 Claims, 15 Drawing Figures

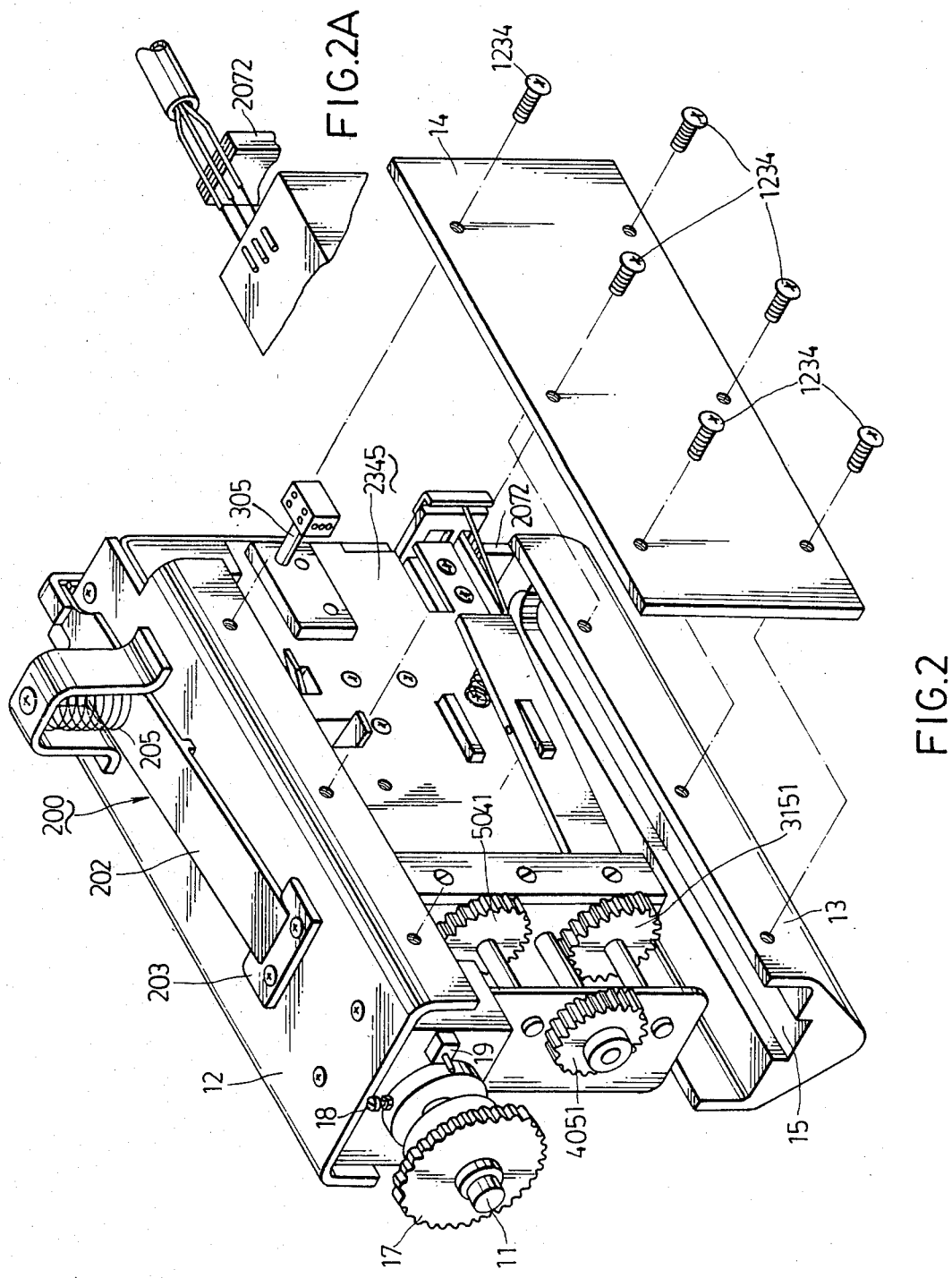

APPARATUS FOR PEELING AND TWISTING AN ELECTRIC WIRE HAVING AN INSULATING COATING

BACKGROUND OF THE INVENTION

The present invention relates to an apparatus for peeling and twisting an electric wire having an insulating coating, and more particularly to an apparatus utilizing cams as actuating media.

For peeling and twisting an electric wire having an insulating coating, there is a device known as Rotary type, as shown in FIGS. 1A, 1B & 1C. A work wire 1 is inserted into the work conduit 2 and against a stopper 3. Upon inserting, work wire 1 pushes the rotating cutter 4 which is mounted by an elastic member 5 on a cutter seat 6, and is urged by rotating cutter 4. Rotating cutter 4 is rotated about work wire 1 to cut the insulating coating 7 of work wire 1. When work wire 1 is pulled outwardly, the cut insulating coating 7' is blocked by rotating cutter 4 which then returns to its unstressed position and thus engages and twists the conductors 8 of work wire 1, as shown in FIG 1B. However, with work wire 1 to push and be urged against by rotating cutter 4, it is inclined to damage the conductors of a work wire. Moreover, such Rotary type device can only deal with a single work wire at a time. In addition, it is impossible to control the tightness of the conductors of a work wire to be twisted by merely using the one's hand to pull the work wire out of the work conduit.

It is therefore attempted to overcome the shortcomings described above.

SUMMARY OF THE INVENTION

According to the present invention, an apparatus for peeling and twisting an electric wire havihg an insulating coating comprises a shaft rotatably mounted on a machine frame and having wire clamping, insulating coating cutting, conductor twisting and cut insulating coating disengaging cams, a wire clamping means mounted on the frame and following the clamping cam and a machine body which is mounted on the shaft and is urged by an elastic member to an end position on the shaft and has an insulating coating cutting means following the insulating coating cutting cam for cutting the insulating coating, a conductor twisting means following the twisting cam for twisting the conductors of the wire and a cut insulating coating disengaging means following the disengaging cam for disengaging the insulating coating which has been cut. The cams of the shaft and the means following them are in such arrangement that they will perform the actions of clamping the wire, cutting the insulating coating, twisting the conductors and disengaging the cut insulating coating when the shaft is revolved a cycle.

The clamping means includes a clamping lever being pivotally mounted on the frame and being urged to follow the wire clamping cam, a movable clamping foot mounted on the clamping lever and a fixed clamping foot secured to the frame and in a position opposite to the movable clamping foot. The movable and fixed clamping feet will clamp and release a work wire in due time when the clamping lever follows the wire clamping cam and in turn sets the movable clamping foot in cooperation with the fixed clamping foot to clamp the wire.

The insulating coating cutting means includes a pivoted insulating coating cutting lever being urged to follow the cutting cam, a movable cutting lip mounted on the cutting lever and a fixed cutting lip secured to the machine body and in a position opposite to the movable cutting lip. The cutting lips will cut the insulating coating when the cutting lever follows the cutting cam and thus in turn sets the movable cutting lip in cooperation with the fixed cutting lip to cut the insulating coating.

To define the length of the insulating coating to be cut, there may be provided a wire stopper inside the machine body to act as an obstacle for the work wire which is to be inserted into the work place of the present apparatus.

The wire stopper can also be engaged by a threaded bolt by which the wire stopper can translate inside the machine body to adjust the length of the insulating coating to be cut.

A fine tuning means may be provided for finely tuning the clearance between the cutting lips for cutting the insulating coating of different wire gauge.

The fine tuning function can be achieved by using a rod. The rod is shaped to have a multi-angular cross-section and such that there is a different length between each of its side surfaces and the axis of the rod. Each side surface of the rod engages with the cutting lever to achieve a different fine tuning setting of the clearance between lips.

For causing the cutting lever to smoothly follow the cutting cam, an intermediate follower is mounted between the cutting cam and the cutting lever.

Further, the cutting lever has a projection to engage with the twisting cam to slightly lift up the movable cutting lip to prevent it from scraping the conductors when the twisting action is executing.

The conductor twisting means includes two sliding pieces, each having a hollow central portion, an active slide piece following the twisting cam and having two inclined surfaces to engage with the hollow central portions of the two sliding pieces to cause the sliding pieces in relative motion, a pivoted wire conductor twisting lever being urged to follow the cutting cam, a first twisting piece movably mounted on the twisting lever, a second twisting piece movably mounted on the machine body and opposite to the first twisting piece and two connecting pieces connecting the sliding pieces and the twisting pieces. The conductors are twisted by the relative motion of the twisting pieces when the sliding pieces are actuated by the active slide piece and thus actuate the connecting pieces which in turn set the twisting pieces in relative motion.

Between the twisting cam and the active slide piece, there is also mounted an intermediate follower for causing the active slide piece to smoothly follow the twisting cam.

Between the twisting cam and the active slide piece, there may be provided with a tightness adjusting means for selecting the tightness of the conductors to be twisted.

The tightness adjusting means can be an adjustable tapered piece, with its tapered surface to define the effective stroke length of the active slide piece to follow the twisting cam.

The cut insulating coating disengaging means includes a little ridge provided on the disengaging cam and a stopping member which can engage with the disengaging cam and thus translates the machine body a length for causing the twisting means to twist the conductors more effectively and disengages the cut insulating coating when the stopping member engages with the little ridge of the disengaging cam to translate the manchine body a little more length.

The disengaging cam is so shaped that it has a first surface to engage with one end of the stopping member for translating the machine body and a second surface to free from engaging with the stopping member.

The stopping member may be provided with an indentation near the other end of the engaging end. A double disk member has two disks of different diameters, the larger disk of which is geared and the member has an annular groove between the two disks to get the rim of the smaller disk to engage with the indentation of the stopping member for varying the translation length of the machine body.

The threaded bolt of the wire stopper and an adjusting medium of the adjustable tapered piece may be plate-geared. Both of the plate-geared bolt and the adjusting medium as well as the geared disk member may be engaged with and adjusted by an adjusting set outside the machine frame.

It is therefore an object of the present invention to provide an apparatus for cutting the insulating coating around the conductors, twisting the conductors, and disengaging the insulating coating in a neat manner and within a short time.

It is another object of the present invention to provide an apparatus for processing a work wire of various gauge.

It is yet an object of the present invention to provide an apparatus which can peel and twist the single or multiple work wires at a time.

It is further an object of the present invention to provide an apparatus for peeling and twisting an electric wire having an insulating coating and the tightness of the conductors of the wire to be twisted is adjustable.

It is an additional object of the present invention to provide an apparatus for peeling and twisting an electric wire and making no harm to the work wire processed.

These and other advantages of the present invention may best be understood with reference to the drawings, in which:

BRIEF DESCRIPTION OF THE DRAWINGS

FIG. 2 is a perspective view showing an upper machine frame incorporated with a machine body as well as a lower machine frame and a side plate of a machine frame of the present invention in a separate position;

FIG. 2A is a perspective view showing a finished multi-wires cable at a fixed clamping foot position of the present invention;

DETAILED DESCRIPTION OF THE PREFERRED EMBODIMENT

Figure 1A:
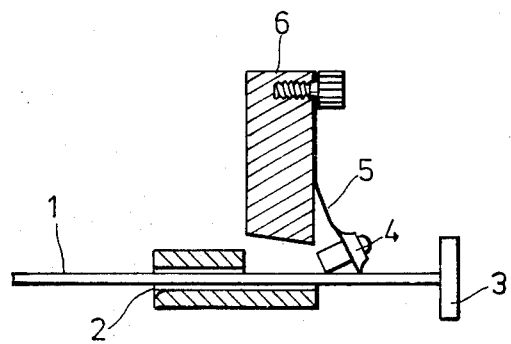
FIG. 1A is a schematic view of a prior known as a Rotary type device for peeling and twisting an electric wire.
Figure 1B:
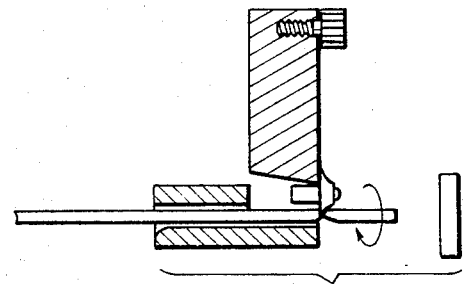
FIG. 1B is a schematic view of a Rotary type device, in which the rotating cutter returns to its unstressed position when the work wire is pulled.
Figure 1C:
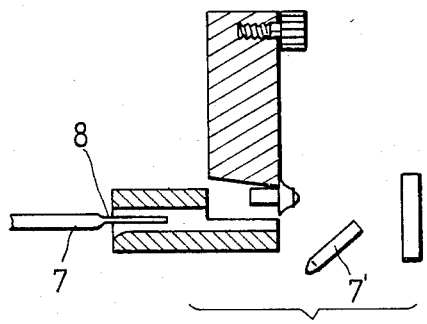
FIG. 1C is a schematic view showing the work wire which has been processed in a Rotary type device.

Referring now to FIG. 2, there is shown an upper machine frame 12, a shaft 11 rotatably mounted on upper frame 12, a machine body 2345 movably mounted on shaft 11, a lower machine frame 13 having a slide groove 15 and a machine frame side plate 14 which connects upper frame 12 and lower frame 13 with screws 1234 at the upper and lower sides. Shaft 11 is provided with a geared transmission wheel 17 adapted to be driven by an electromagnetic clutch (not shown) which in turn is driven by a motor (not snown) and controlled by a micro switch 19 mounted on upper frame 12. The geared transmission wheel 17 is provided with a micro switch contact breaker 18 which disconnects the electromagnetic clutch with geared transmission wheel 17 of shaft 11 when it contacts micro switch 19. Machine body 2345 has two slide wheels 3141, 3142 which can slide in slide groove 15 of lower frame 13.

Figure 3:
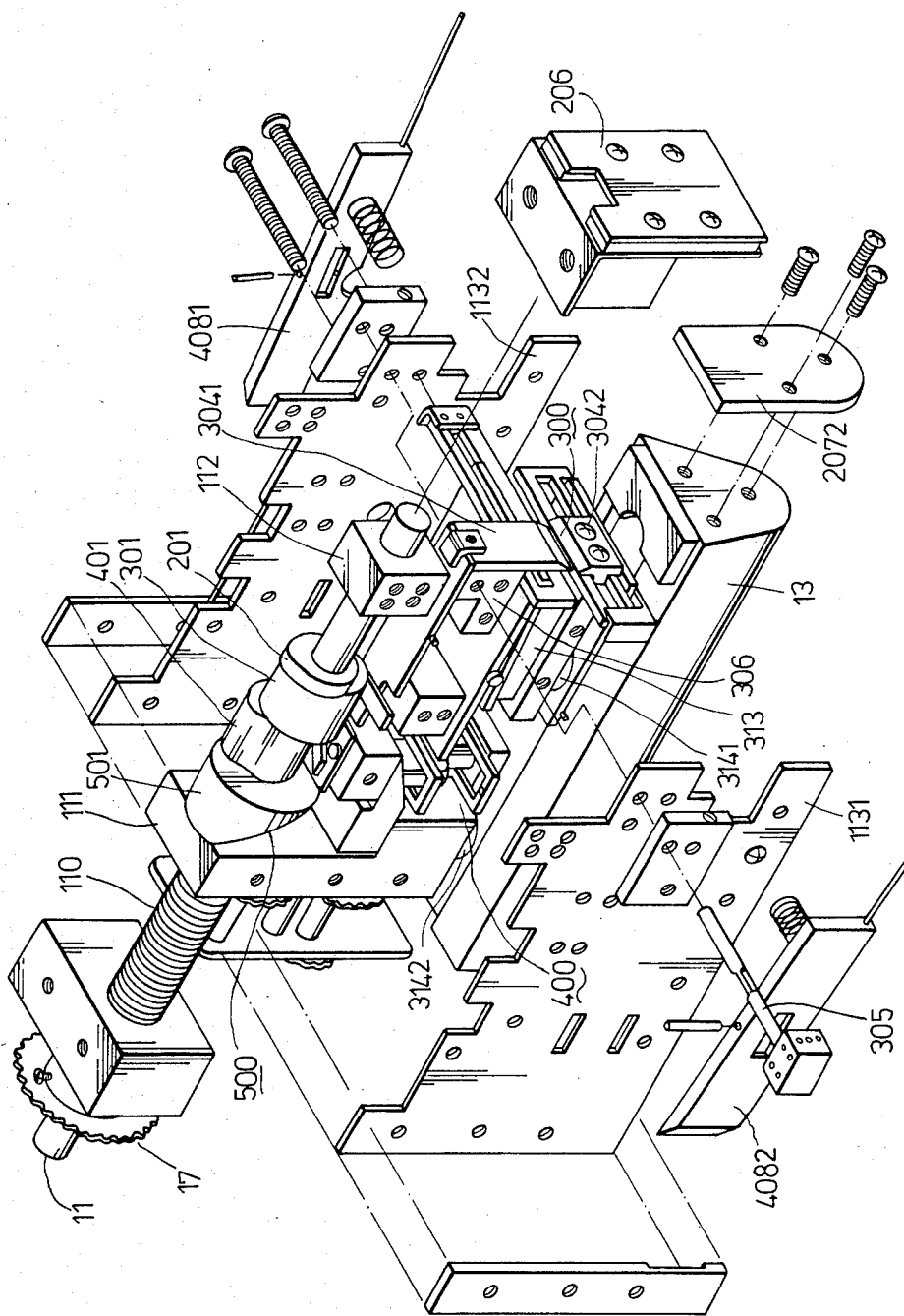
FIG. 3 is a partly exploded view of a machine body of the present invention of an apparatus for peeling and twisting an electric wire having an insulating coating.

A shaft 11 coaxial spring 110 is mounted between an end of shaft 11 near geared transmission wheel 17 and one shaft mounting side 111 of machine body 2345 to urge machine body 2345 to another end positon of shaft 11, as shown in FIG. 3. Shaft 11 is provided with a wire clamping cam 201, an insulating coating cutting cam 301, a conductor twisting cam 401 and a cut insulating coating disengaging cam 501. With the other shaft mounting end 112 of machine body 2345 and the shaft mounting side 111, machine body 2345 is movably mounted on shaft 11. Machine body 2345 has an insulating coating cutting means 300, a conductor twisting means 400 and a cut insulating coating disengaging means 500 mounted to follow the insulating coating cutting cam 301, conductor twisting cam 401 and cut insulating coating disengaging cam 501 of shaft 11 respectively. Machine body 2345 also has a front piece 1131 and a back piece 1132 for mounting therein the means 300, 400 and 500.

Figure 4:
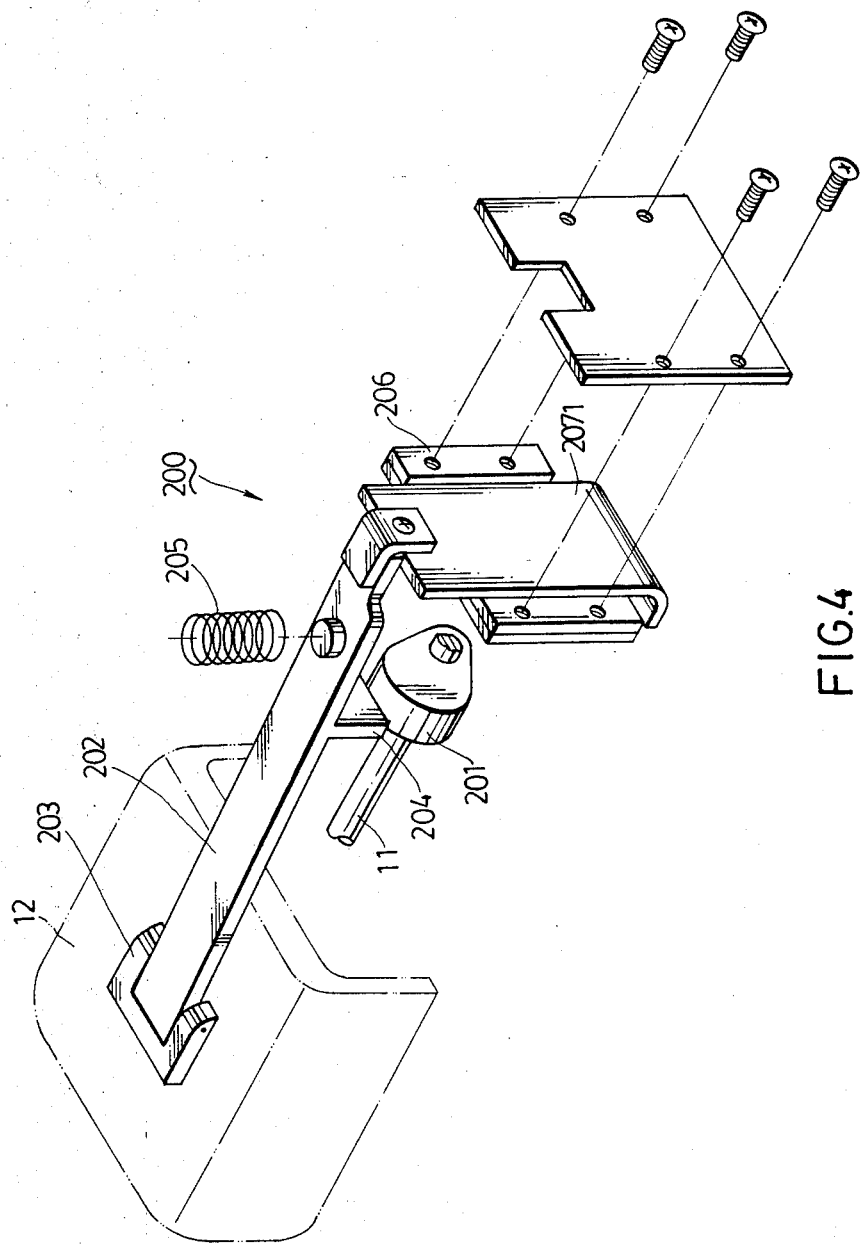
FIG. 4 is a perspective view of a wire clamping means of the present invention.

A wire clamping means 200 of the present invention, as shown in FIG. 4, includes a clamping lever 202, a movable clamping foot 2071 and a fixed clamping foot 2072. Clamping lever 202 has an end pivoted on a lever support 203 which is fixed to upper frame 12 and has a flange 204 through a hole of upper frame to engage wire clamping cam 201. A spring 205 is introduced to urge flange 204 of clamping lever 202 to follow clamping cam 201. The other end of clamping lever 202 is mounted movable clamping foot 2071 received in a clamping foot retainer 206 which is fixed to upper frame 12. Fixed clamping foot 2072 is secured on lower frame 13 and in a position opposite to movable clamping foot 2071. The wire clamping cam 201 is so shaped that movable and fixed clamping feet 2071, 2072 will clamp and release a work wire in due time when clamping lever 202 follows wire clamping cam 201 and in turn sets movable clamping foot 2071 in cooperation with fixed clamping foot 2072 to process the work wire.

Figure 5:
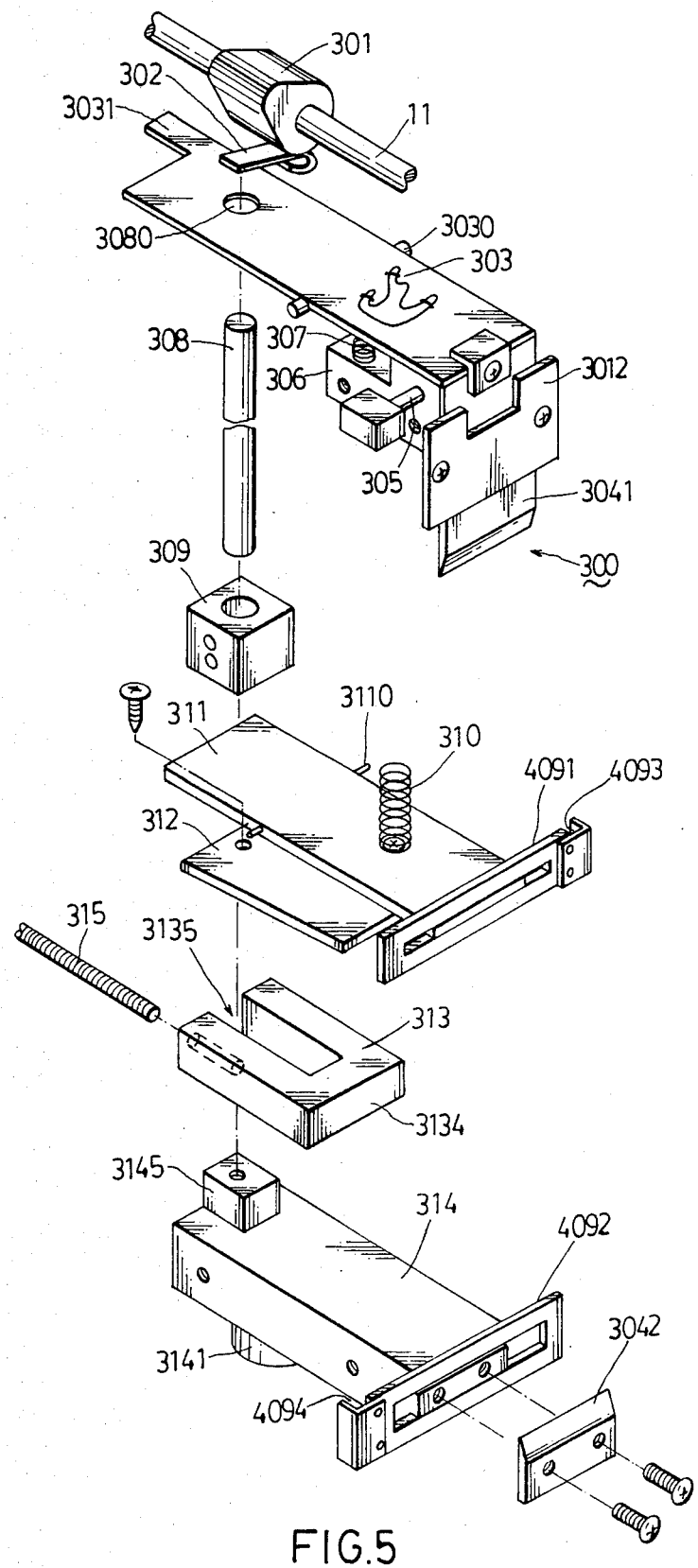
FIG. 5 is an exploded view of an insulating coating cutting means of the present invention.

An insulating coating cutting means of the present invention, as shown in FIG. 5, includes an insulating coating cutting lever 303, a movable cutting lip 3041 and a fixed cutting lip 3042. Cutting lever 303 has two lugs 3030 as fulcrums pivotally mounted on two holes of front and back pieces 1131, 1132 of machine body 2345. An intermediate follower 302 is mounted between cutting cam 301 and cutting lever 303 on back piece 1132 for smoothly transmitting the cam action. A projection 3031 on an end of cutting lever 303 acts as will be described later. Movable cutting lip 3041 is mounted on the other end of cutting lever 303 through a cutting lip retainer 3012 screwed on a securing block 306 which is mounted on pieces 1131, 1132 of machine body 2345. Fixed cutting lip 3042 is screwed on another securing block 314 which is mounted on pieces 1131, 1132 of macnine body 2345 and provided with slide wheel 3141 for sliding in slide groove 15 of lower frame 13.

A fine tuning rod 305, mounted between securing block 306 and cutting lever 303 to function as a lips clearance finely tuning means, will be illustrated somewhat later.

A conductor twisting lever 311 is actuated by cutting cam 301 and will do a help of the cutting for cutting lips 3041, 3042. Twisting lever 311 has two lugs 3110 as fulcrums pivotally mounted on two holes of front and back pieces 1131, 1132 of machine body 2345. A pressing rod 308 passing through a hole 3080 of cutting lever 303 and a rod guiding block 309 which is secured to pieces 1131, 1132 transmits the cam action to twisting lever 311. An upper twisting piece 4091 has a central longitudinal groove movably engaged with an end of twisting lever 311 and is in a position opposite to a lower twisting piece 4092 which also has a central longitudinal groove movably engaged between securing block 314 and lower cutting lip 3042. Twisting pieces 4091, 4092 will grip the work wire for the cutting lips 3041, 3042 to accurately cut the insulating coating of the work wire when cutting lever 303 and pressing rod 308 free from a surface of cutting cam 301. At this time a tensile spring 307 mounted between cutting lever 303 and securing block 306 will pull down lever 303 which thus sets upper cutting lip 3041 in cooperation with lower cutting lip 3042 to cut the insulating coating and a compressive spring 310 mounted between securing block 306 and twisting lever 311 will push down the twisting lever 311 which thus sets upper twisting piece 4091 in cooperation with lower twisting piece 4092 to grip the work wire to make cutting lips 3041, 3042 to have a neat cut.

A wire stopper 313 is mounted between twisting lever 311 and securing block 314. The distance between a surface 3134 of stopper 313 and the cutting place of cutting lips 3041, 3042 defines the length of the insulating coating of a work wire to be cut. An obstacle 3145 mounted on securing block 314 engages with a groove 3135 of stopper 313 to prevent stopper 313 from escape. A bolt 315 threadedly engages with stopper 313 to adjust the distance between surface 3134 and the cutting place of cutting lips 3041, 3042 to set the length of the insulating coating of a work wire to be cut off. A guiding plate 312 mounted between twisting lever 311 and stopper 313 will help to guide the work wire to be inserted into the work place for being processed.

Figure 6:
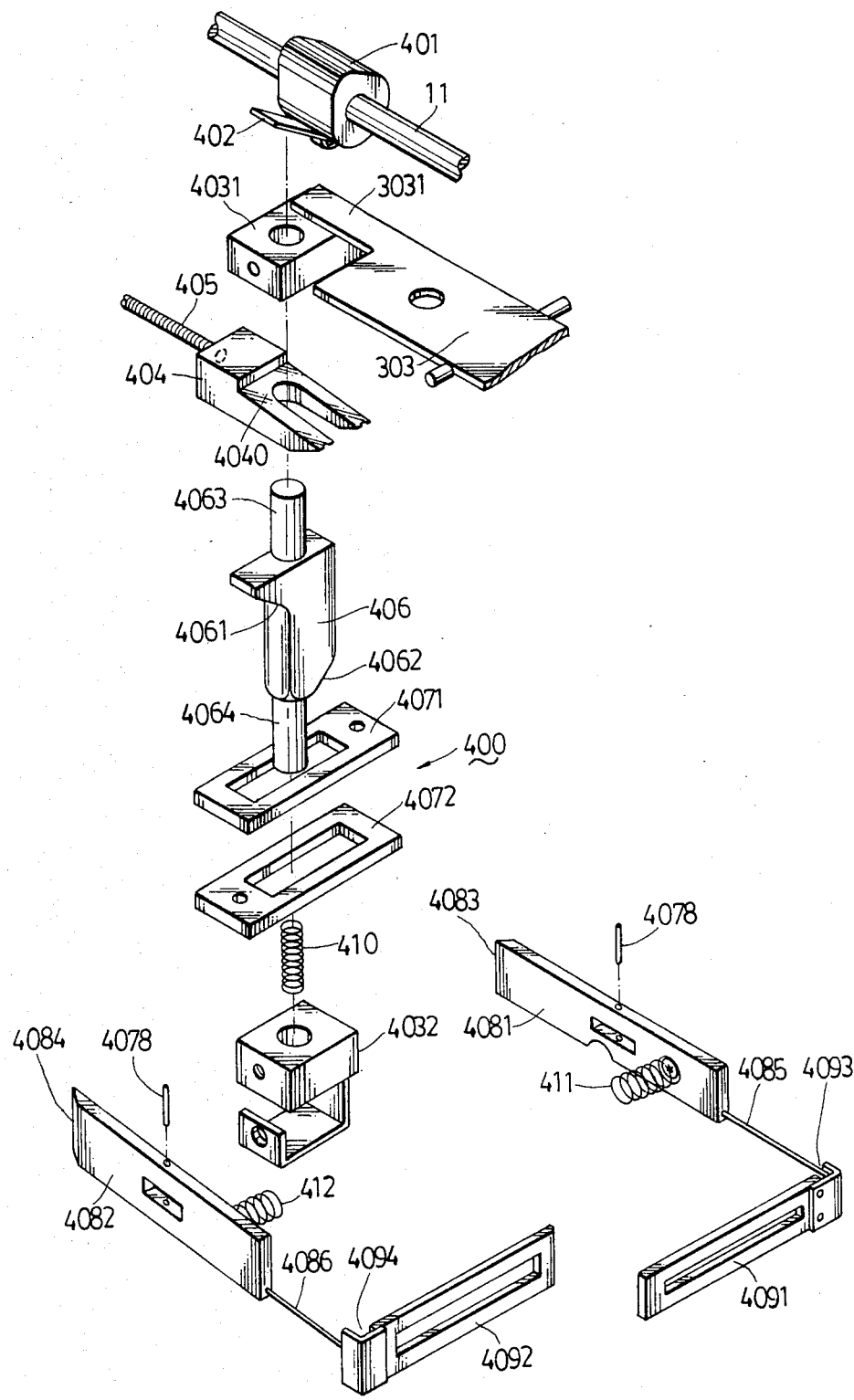
FIG. 6 is an exploded view of a conductor twisting means of the present invention.

A conductor twisting means 400 of the present invention, as shown in FIG. 6, includes an active slide piece 406, two sliding pieces 4071, 4072, two connecting pieces 4081, 4082 and above described twisting pieces 4091, 4092. Two sliding pieces 4071, 4072 are movably mounted on pieces 1131, 1132 of machine body 2345 in their own longitudinal direction and engage with the inclined surfaces 4061, 4062 of active slide piece 406 respectively. Two connecting pieces 4081, 4082 have ends 4083, 4084 pivoted on back and front pieces 1132, 1131 and two pins 4078, 4078 pin them and the sliding pieces 4071, 4072 together respectively. The other ends 4085, 4086 of connecting pieces 4081, 4082 engage in two slots 4093, 4094 of twisting pieces 4091, 4092 respectively. Two ends 4063, 4064 of active slide piece 406 are guided by the upper and lower slide guiding seats 4031, 4032 which are secured to pieces 1131, 1132, respectively. Another intermediate follower 402 is mounted between twisting cam 401 and upper guiding seat 4031 on back piece 1132 for smoothly transmitting the cam action. A spring 410 mounted between lower sliding piece 4072 and lower guiding seat 4032 and two springs 411, 412 mounted between connecting pieces 4081, 4082 and pieces 1132, 1131 respectively are introduced for urging active slide piece 406, connecting pieces 4081, 4082 to return to their non-actuated positions respectively. The twisting cam 401 is so shaped that the conductors of the work wire are twisted by the relative motion of twisting pieces 4091, 4092 when sliding pieces 4071, 4072 are actuated by inclined surfaces 4061, 4062 of active slide piece 406 and thus actuate connecting pieces 4081, 4082 which in turn set twisting pieces 4091, 4092 in relative motion.

The projection 3031 is actuated by twisting cam 401 for lifting movable cutting lip 3041 up a little for preventing it from scraping the conductors when the twisting pieces 4091, 4092 are executing the twisting action.

An adjustable tapered piece 404 is mounted between upper guiding seat 4031 and active slide piece 406 to act as a tightness adjusting means. With the tapered surface 4040 of tapered piece 404, the effective stroke length of active slide piece 406 to follow twisting cam 401 can be varied, i.e. the crevice occupied by tapered piece 404 between upper guiding seat 4031 and active slide piece 406 is determined by tapered surface 4040 of tapered piece 404 and is compensated by spring 410. Thus, the effective stroke length of active slide piece 406 to foliow twisting cam 401 can be varied and the degree of twisting pieces 4091, 4092 being actuated will be changed accordingly, that is to say, the tightness of the conductors to be twisted is thus selected A threaded bolt 405 is used to engage with tapered piece 404 to adjust tapered surface 4040 of tapered piece 404 to define the effective stroke length.

Figures 7, 7A, 7B:
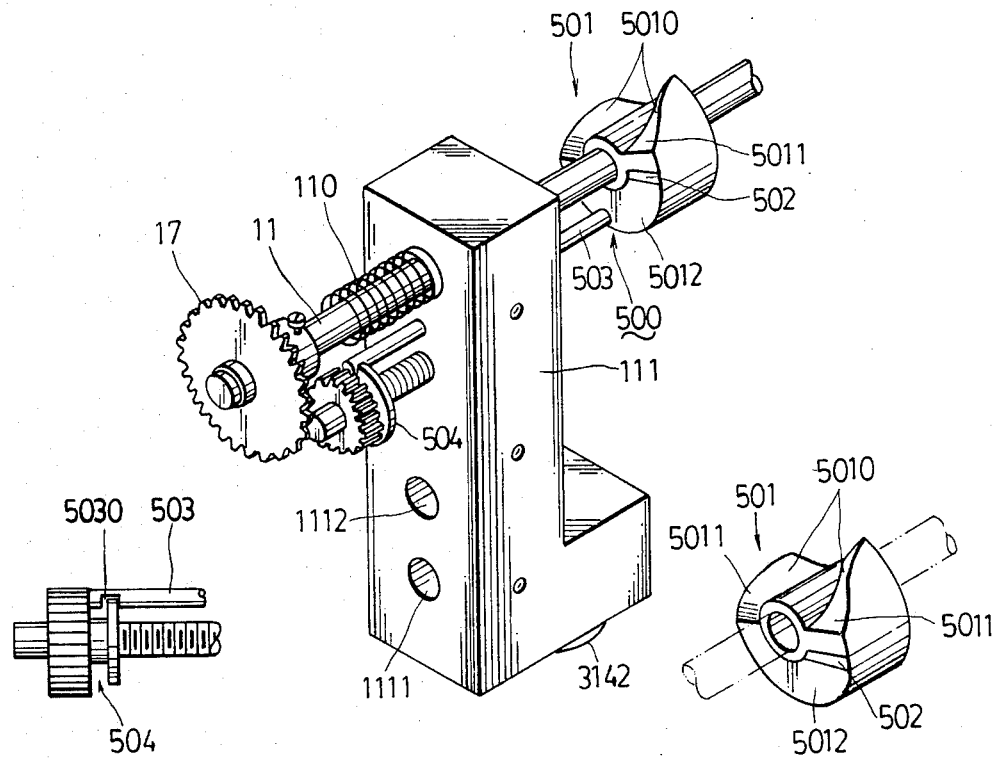
FIG. 7 is a perspective view of a cut insulating coating disengaging means of the present invention.
FIG. 7A is a sectional view snowing a stopping member engaging with a double disk member of the present invention.
FIG. 7B is a perspective view showing a disengaging cam of the present invention.

A cut insulating coating disengaging means 500 of the present invention, as shown in FIG. 7, includes a stopping member 503 and a little ridge 502 on cut insulating coating disengaging cam 501 of shaft 11. Stopping member 503 mounted through shaft mounting side 111 of machine body 2345 has an indentation 5030 at one end. A double disk member 504 has a shaft threadedly mounted on shaft mounting side 111 of machine body 2345 and the two disk of which have different diameters The larger disk is geared and there is an annular groove between the two disks. Indentation 5030 of stopping member 503 engages with the rim of the smaller disk, as shown in FIG. 7A. Stopping member 503 has the other end which frees from engagement with surface 5010 of disengaging cam 501 when twisting pieces 4091, 4092 grip the work wire for cutting lips 3041, 3042 to cut the insulating coating and engages with surface 5011 and the top surface 5012 of disengaging cam 501 to translate machine body 2345 a length for causing twisting pieces 4091, 4092 to twist the conductors more effectively as the twisting pieces 4091, 4092 are gripping and twisting the conductors within the cut insulating coating closely near the ends of the conductors now when twisting pieces 4091, 4092 are actuated by twisting cam 401 to twist the conductors. Little ridge 502 is provided on disengaging cam 501 to disengage the cut insulating coating when the conductors have been twisted and thereupon stopping member 503 engages with it to translate machine body 2345 a little more length to disengage the cut insulating coating. As stopping member 503 engages with double disk member 504, the stopping member 503 will have different piercing lengths within machine body 2345 an thus can vary the translation length of machine body 2345 when the threaded shaft of the double disk member is rotated. Besides, slide wheel 3142 provided on shaft mounting side 111 of machine body 2345 is also shown in FIG. 7 and a perspective view of the disengaging cam 501 is shown in FIG. 7B.

The bolt 315 which controls the length of the insulating coating to be cut and the threaded bolt 405 wnich defines the effective stroke length of active slide piece 406 to follow twisting cam 401 are mounted through holes 1111, 1112 of shaft mounting side 111 of machine body 2345 respectively.

Figure 9A:
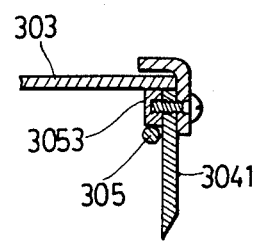
FIG. 9A is a sectional view showing how a fine tuning rod of a fine tuning means engages with an insulating coating cutting lever of the present invention.
Figure 9:
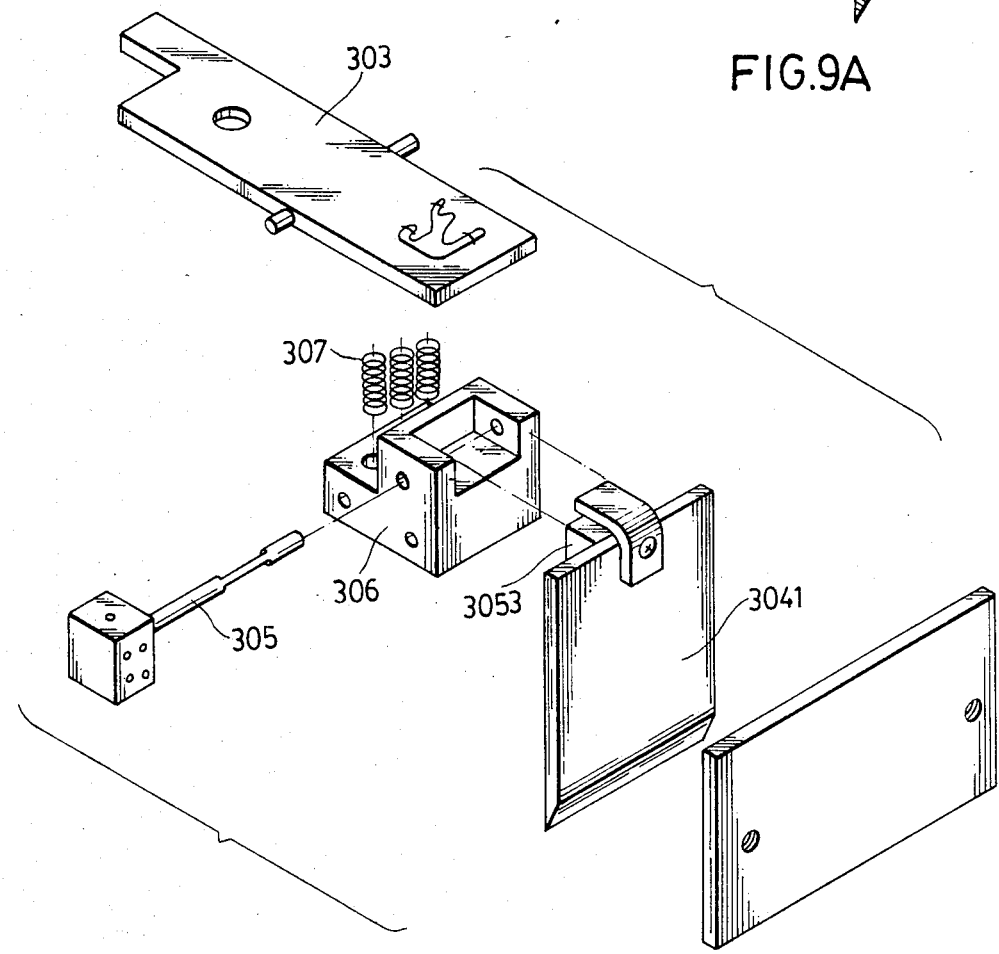
FIG. 9 is an exploded view of a fine tuning means of the present invention.

A cutting lips clearance fine tuning means of the present invention, as shown in FIG. 9, will be illustrated now. The fine tuning rod 305 is rotatably mounted on the machine body and has a section thereof being shaped multiangular to have different spaces between its each side surface and the axis of the rod. Thus, each side surface of the multiangular section of rod 305 will urge up cutting lever 303 somewhat differently to finely setting the clearance between cutting lips 3041, 3042 for cutting the insulating coating of different wire gauge. A block 3053 for being screwed thereon the movable cutting lip 3041 to follow cutting lever 303 engages with the multiangular section of fine tuning rod 305 to urge cutting lever 303 up, as shown in a sectional view of FIG. 9A.

Figure 8:
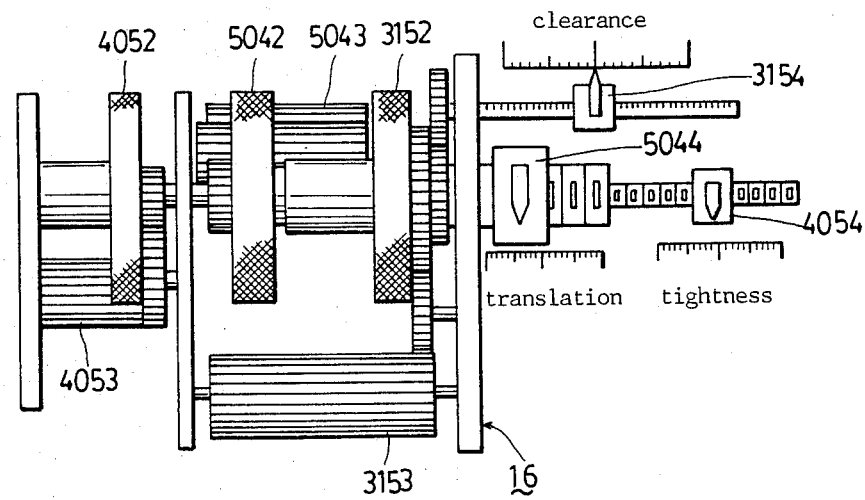
FIG. 8 is a schematic view showing an adjusting set of the present invention.

Referring back now to FIG. 2, bolts 315, 405 and the shaft of double disk member 504 are mounted plate gears 3151, 4051 and 5041 respectively. An adjusting set 16 of the present invention, as shown in FIG. 8, has the three adjusting rings 3152, 4052 and 5042 which respectively are designed to drive the three transmission gears 3153, 4053 and 5043 which in turn engage with plate gears 3051, 4051 and 5041 respectively to make any adjustment which one desires. Adjusting rings 3152, 4052 and 5042 are also designed to be able to drive three pointer 3154, 4054 and 5044 respectively to record the adjustment which one has made for one's reference.

The execution of processing a work wire of the present apparatus is described as follows.

A work wire is inserted into the work place to urge against wire stopper 313. Switched on power actuates electromagnetic clutch to drive transmission wheel 17 and thus rotate shaft 11. In the very beginning, wire clamping cam 201 turns to release flange 204 of clamping lever 202. Spring 205 urges down clamping lever 202 whicn in turn sets upper clamping foot 2071 in cooperation with lower clamping foot 2072 to clamp the work wire. Then, cutting cam 301 turns to disengage with intermediate follower 302 to release cutting lever 303 and to disengage with pressing rod 308 to release twisting lever 311. At this time, compressive spring 310 and tensile spring 307 set twisting pieces 4091, 4092 and cutting lips 3041, 3042 in cooperation to grip and cut the insulating coating of the work wire respectively as described before. Then, stopping member 503 engages with the surface 5011 of disengaging cam 501 to begin to get shaft mounting side 111 to translate the machine body 2345. When stopping member 503 engages top surface 5012 and thus machine body 2345 stops translating, intermediate follower 402 follows twisting cam 401 to press down active slide piece 406 which in turn actuates twisting pieces 4091, 4092 in relative motion through the help of sliding pieces 4071, 4072 and connecting pieces 4081, 4082 as described before to grip and twist the coductors within the cut insulating coating closely near the ends of the conductors and to urge the projection 3031 of cutting lever 303 to iIft up movable cutting lip 3041 a little for preventing it from scraping the conductors when the twisting pieces 4091, 4092 are twisting the conductors.

As the twisting action is executed, stopping member 503 engages with little ridge 502 for translating machine body 2345 a little more length to disengage th nearly disengaging cut insulating coating. Now, the processing of a work wire has been performed. Spring 110 urges machine body 2345 to return to an end position of shaft 11 when stopping member 503 frees from a surface 5010 again. Shaft 11 has revolved a cycle and contact breaker 18 contacts micro switch 19 to switch off electromagnetic clutch when clamping cam 201 and cutting cam 301 respectively urge clamping lever 202 up and cutting lever 303 & twisting lever 311 down whicn in turn lift movaole clamping foot 2071 and movable cutting lip 3041 & upper twisting piece 4091 up respectively. Tnis apparatus is ready for peeling and twisting an electric wire having an insulating coating again.

It is to be noted that a certain number of work wires can be put for being processed in this apparatus without failure, as shown in FIG. 2A.

In addition, a nozzle can be provided near the cutting and twisting place for blowing off the cut insulating coating.

While the present invnetion has been described in connection with what is presently considered to be the most pratical and preferred embodiment, it is to be understood that the invention is not to be limited to the disclosed embodiment but on the contrary, is intended to cover various modifications and equivalent arrangements included within the spirit and scope of the appended claims which scope is to be accorded the broadest interpretation so as to encompass all such modifications and equivalent structures.

What I claim is:

1. An apparatus for peeling and twisting an electric wire having an insulating coating comprising:
   a machine frame;
   a shaft, rotatably mounted on said frame, having thereon a wire clamping cam, an insulating coating cutting cam, a conductor twisting cam and a cut insulating coating disengaging cam, said shaft being adapted to be driven by a motor;

means, mounted on said frame and following said clamping cam, for clamping said wire; and a machine body, moveably mounted on said shaft, including an insulating coating cutting means, following said insulating coating cutting cam, for cutting said insulating coating of said wire, a conductor twisting means, following said conductor twisting cam, for twisting the conductors of said wire, and a cut insulating coating disengaging means, following said disengaging cam, for disengaging the insulating coating which has been cut, wherein the cams of said shaft and their respective following means are so arranged that they will perform the actions of clamping said wire, cutting said insulating coating, twisting said conductors and disengaging said cut insulating coating when said shaft has revolved a cycle.

2. An apparatus according to claim 1, wherein said wire clamping means includes:

a clamping lever having a flange and an elastic element for urging said flange to follow said wire clamping cam and with one end of said lever being pivotally mounted on said frame;

a moveable clamping foot mounted on the other end of said clamping lever; and a fixed clamping foot secured to said frame in a position opposite to said moveable clamping foot whereby said moveable and fixed clamping feet will clamp and release said work wire in due time when said clamping lever follows said wire clamping cam and in turn sets said moveable clamping foot in cooperation with said fixed clamping foot to process said wire.

3. An apparatus according to claim 1, wherein said insulating coating cutting means comprises:

an insulating coating cutting lever having a first fulcrum being pivoted on said machine body;

an elastic member, mounted in said machine body, for urging said cutting lever against and following said cutting cam of said shaft;

a moveable cutting lip mounted on said cutting lever; and a fixed cutting lip secured to said machine frame and in a position opposite to said movable cutting lip, whereby said cutting lips cut said insulating coating when said cutting lever follows said cutting cam and thus in turn sets said moveable cutting lip in cooperation with said fixed cutting lip to cut said insulating coating.

4. An apparatus according to claim 3, further comprising: a wire stopper mounted inside said machine body and with the distance between a side surface of said stopper parallel and nearest to said cutting lips and the cutting place of said cutting lips defining the length of the insulating coating to be cut.

5. An apparatus according to claim 4, further comprising: a bolt threadedly mounted on said machine body and engaged with said wire stopper to adjust said distance for setting the length of the insulating coating to be cut off.

6. An apparatus according to claim 3, further comprising: a fine tuning means, engaged with said cutting lever, for finely tuning the clearance between said cutting lips for cutting said insulating coating of different wire gauges.

7. An apparatus according to claim 6, wherein aid fine tuning means is a rod rotatably mounted on said machine body and having a portion with a cross section shaped multiangular so as to have different spaces between each side surface of said multiangular section and the axis of said rod and is in engagement with said cutting lever for differently and finely setting said clearance.

8. An apparatus according to claim 3, further comprising: a first intermediate follower mounted between said cutting cam and said cutting lever for causing said cutting lever to smoothly follow said cutting cam.

9. Amended An apparatus according to claim 3, wherein said cutting lever further includes a projection to engage with said twisting cam to prevent said moveable cutting lip from scraping said conductors of said wire by slightly lifting said moveable cutting lip by said twisting cam when said twisting action is executing.

10. An apparatus according to claim 1, wherein said conductor twisting means comprises:

a first sliding piece having a first hollow central portion and moveably mounted on said machine body;

a second sliding piece having a second hollow central portion and moveably mounted on said machine body;

an active slide piece following said twisting cam and having a first inclined surface to engage said first hollow central portion and a second inclined surface to engage with said second hollow central portion and in a way to cause said first sliding piece and second sliding piece to move relative to one another when said active slide piece follows said twisting cam;

a wire conductor twisting lever having a second fulcrum being pivoted on said machine body; an elastic member, mounted on said machine body, for urging said twisting lever against and following said cutting cam;

a first twisting piece moveably mounted on said twisting lever and having a first twisting surface;

a second twisting piece moveably mounted on said machine body and having a second twisting surface in a position opposite to said first twisting surface of said first twisting piece;

a first connecting piece engaged with and actuated by said first sliding piece and having a first end to engage with said first twisting piece; an elastic member, mounted on said machine body, for urging said first connecting piece against said machine body; and a second connecting piece engaged with and actuated by said second connecting piece engaged with and actuated by said second sliding piece and having a second end to engage with said second twisting piece; an elastic member, mounted on said machine body, for urging said second connecting piece against said machine body whereby said conductors are twisted by the relative motion of said twisting pieces when said sliding pieces are actuated by said inclined surfaces of said active slide piece and thus actuate said connecting pieces which in turn set said twisting pieces in relative motion.

11. An apparatus according to claim 10, further comprising: a second intermediate follower mounted between said twisting cam and said active slide piece for causing said active slide piece to smoothly follow said twisting cam.

12. An apparatus according to claim 10, further comprising: a tightness adjusting means mounted between said twisting cam and said active slide piece for selecting the tightness of said conductors to be twisted by varying the effective stroke length of said active slide piece to follow said twisting cam.

13. An apparatus according to claim 12, wherein said tightness adjusting means is an adjustable tapered piece with its tapered surface to define said effective stroke length.

14. An apparatus according to claim 1, wherein said cut insulating coating disengaging means includes:
- an elastic member for urging said machine body to an end position said shaft;
- a ridge provided on said disengaging cam; and
- a stopping member adjustably mounted on said machine body and having an engaging end which can engage with said disengaging cam to translate said machine body a predetermined length for causing said twisting means to twist said conductors more effectively as said twisting means is twisting said conductors closely near the ends of said conductors, and disengaging said cut insulating coating when said conductors have been twisted and thereupon said engaging end engages with said ridge of said disengaging cam to lengthwise translate said machine body to disengage said cut insulating coating.

15. An apparatus according to claim 14, wherein said disengaging cam has a first sufrace to engage with said stopping member for translating said machine body when said twisting means is twisting said conductors and a second surface to free from engaging with said stopping member when said twisting means has completed said twisting.

16. An apparatus according to claim 14, further comprising:
- a double disk member having a threaded shaft rotatably mounted on said machine body, the two disks of which member have different diameters and the larger disk is geared, and having an annular groove between said two disks; and said stopping member provided with an indentation near the other end of said engaging end to engage with the rim of the smaller disk
- whereby said stopping member can vary said translation length of said machine body when said threaded shaft is rotated.

* * * * *